July 31, 1934.                    C. J. HANSEN                    1,968,682
        APPARATUS FOR THE PRODUCTION OF SOLID AMMONIUM
                    SULPHATE AND DIAMMONIUM PHOSPHATE
                            Filed June 3, 1931
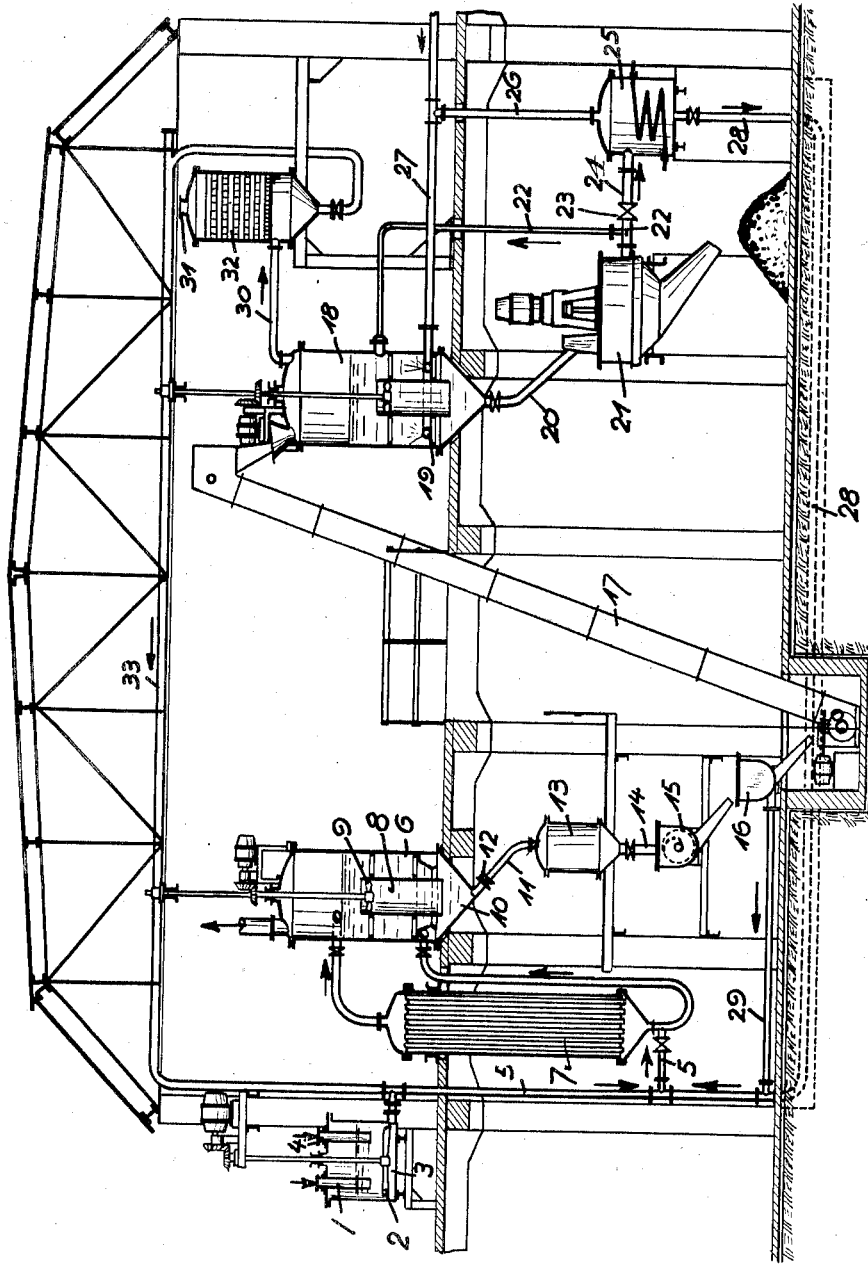
Inventor:
Christian Johannes Hansen
By Henry Loon Clarke
his atty

UNITED STATES PATENT OFFICE 1,968,682

APPARATUS FOR THE PRODUCTION OF SOLID AMMONIUM SULPHATE AND DIAMMONIUM PHOSPHATE

Christian Johannes Hansen, Essen, Germany, assignor, by mesne assignments, to The Koppers Company of Delaware, Pittsburgh, Pa., a corporation of Delaware Application June 3, 1931, Serial No. 541,778
In Germany May 30, 1930

7 Claims. (Cl. 23—260)

The invention relates to apparatus for the production of a mixture of solid ammonium sulphate and diammoniumphosphate from solutions which contain ammonium sulphate and any ammonium phosphate.

The production of a mixture of solid ammoniumsulphate and diammoniumphosphate from solutions containing ammonium sulphate and any ammoniumphosphate, has not been practical heretofore because, on the one hand, on evaporating the solutions containing diammoniumphosphate and triammoniumphosphate, ammonia escapes until monoammoniumphosphate is formed and, on the other hand, ammonium sulphate and monoammoniumphosphate are soluble in various degrees, and therefore on cooling-off of the evaporated solution, solid ammonium sulphate and monoammoniumphosphate are not crystallized out in the same proportion as these two salts were contained in solution, but a salt mixture ensues which consists for the most part of ammoniumsulphate.

Now, the object of this invention is to provide apparatus which renders it possible to recover a mixture of solid ammonium sulphate and diammoniumphosphate from solutions containing ammoniumphosphate, either in the form of mono-, di- or triammoniumphosphate, in the same proportions as these two compounds exist in the solution to be treated. In the embodiment of the invention illustrated herein an ordinary evaporating crystallization apparatus is provided which serves for the evaporation of the sulphate-phosphate solution to be treated. In case the solution contains di- or triammoniumphosphate, phosphoric acid is added before the evaporation takes place. A salt draw-off pipe line for the evaporator crystallization vessel is connected with a separating apparatus for separating out of the mother liquor the crystals formed, from whence these crystals are led off to an agitator saturator vessel filled with saturated ammonium-sulphate-diammoniumphosphate solution. The agitator saturator vessel is fitted with a gas conduit for introducing ammonia in gas form and separating apparatus which are arranged after the crystallizer evaporator and the agitator saturator vessel, for the removal of the mother liquor, are connected up by pipe lines with the evaporator for the purpose of returning the mother liquor produced.

Furthermore, according to the invention, in the mother liquor return pipe line which connects up the crystallization evaporator with the separator after the agitator saturator vessel serving to separate the mother liquor from salts from the saturator, a heatable closed vessel is connected to heat the mother liquor to form mono-ammonium phosphate. This vessel is also connected with the ammonia gas pipe line, leading to the agitator saturator, in order to deliver thereto ammonia vapours escaping from the mother liquor during the formation of monoammonium phosphate from the diammoniumphosphate on its being heated up.

Moreover, according to the invention the gas collecting space in the agitator vessel is connected, by means of a pipe line with a washing apparatus discharging into the atmosphere which washing apparatus is filled with sulphuric and phosphoric acid which is carried forward through a pipe line into the evaporator. Finally according to the invention an agitator vessel is provided in the pipe line leading to the evaporator for agitating the salt solution to be treated in the evaporator, which vessel is also connected with the phosphoric acid storage holder for receiving phosphoric acid therefrom.

On the drawing there is shown, in a vertical section, apparatus for producing mixtures of solid ammonium sulphate and diammonium phosphate from solutions of ammonium sulphate and ammonium phosphate.

In the embodiment of the invention shown on the drawing, a solution of ammonium sulphate and diammonium phosphate contained in a storage holder is carried forward through the pipe branch 1 into a crystallization evaporator vessel 3 which is provided with an agitator 2 and into which by means of the pipe branch 4, the proportionate quantity of phosphoric acid solution is simultaneously introduced from a storage tank, which is not shown, for the conversion of the diammoniumphosphate from pipe 1 into monoammoniumphosphate.

The ammoniumsulphate monoammoniumphosphate solution then goes forward through the pipe line 5 into an evaporator comprising the crystallizing vessel 6 connected with a tubular heating element 7 which is heated as is customary and has a stirrer 9 fitted in a vertical recirculation pipe 8 in order to effect circulation in the form of a circle of the fluid through the pipe 8 for the purpose of producing large crystal salts.

To the preferably conical shaped bottom 10 of the crystallizing vessel 6 is connected a salt draw-off pipe line 11 which is controlled by the valve 12 and discharges out into a storage tank 13. This tank 13 is connected, by means of the pipe line 14, with a cooler comprising mixing worm 15 provided with a cooling apparatus or with an otherwise cooling appliance for the salt slime, from which the cooled salt slime falls into a mother-liquor separator or drip-off channel 16. This form of separator can be replaced by a centrifugal or any other suitable separator.

The salt mixture separated out from the mother liquor and comprising ammonium sulphate and monoammoniumphosphate crystals is carried forward from the drip-off channel 16, by means of a bucket elevator 17 or of an otherwise suitable transport means to a stirring vessel 18 which contains a solution saturated with ammoniumsulphate and diammoniumphosphate and is provided with a similar contrivance for bringing about a circulation of the fluid the same as in the crystallizing vessel 6 of the evaporator. In the space containing the fluid in the stirring vessel 18 there is a spray 19 for introducing the gaseous ammonia.

In the vessel 18 the monoammoniumphosphate crystals carried forward to the stirring vessel 18 are converted on contact with the ammoniumsulphate diammoniumphosphate solution by the introduction of ammonia into diammoniumphosphate crystals. These are from time to time or continually drawn off through a pipe line 20 on the bottom of the crystallizing vessel, which leads to the salt centrifugal separator 21 from which the crystals are separated from the mother liquor. The latter is returned by the pipe line 22 continually to the stirring vessel 18. Only that quantity of mother liquor, which results from the residue of mother-liquor in the crystals from the drip-channel 16 and the moisture in the ammonia gases flowing continuously into the liquid in the stirring vessel 18 from the conduit 27, is led by means of a pipe line 24 controlled by the valve 23 into the vessel 25 wherein such quantity of mother liquor is heated by means of steam coils, or any other suitable manner, until the largest part of diammoniumphosphate is reconverted into monoammoniumphosphate i. e. the solution at boiling temperature shows no more an ammonia tension. The gaseous ammonia which escapes during this operation is carried forward by means of the pipe line 26 to the pipe line 27 leading to the ammonia spray 19. Whereas on the other hand the solution containing principally monoammoniumphosphate freed from ammonia is returned by the pipe line 28 to the evaporator 6.

Likewise the mother liquor running to the dripping channel 16 is again carried forward by the pipe line 29 to the evaporator 6.

To the top of the stirring vessel 18 there is connected a pipe line 30 leading to a washing vessel 32 which is filled with a sulphuric or phosphoric acid solution and into the outside air by the branch 31. By reason of the acid solution, any excess of ammonia escaping from the stirring vessel 18 is absorbed. If the washing acid is spent, it can be carried by means of the pipe line 33 likewise to the evaporator.

By reason of the structural arrangement of the elements in accordance with the invention, of which the individual elements are known, there is obtained the valuable advantage that it is possible to carry out the process above described, in a simple manner without any of the reaction compounds escaping from the process at any point. Should the novel arrangement of this invention be used for the production of mixtures from solutions already containing ammoniumsulphate and diammoniumphosphate, the stirring vessel 3 is of course superfluous.

I wish it to be understood that I do not desire to be limited to the exact details of construction shown and described for obvious modifications will occur to a person skilled in the art.

I claim:

1. Apparatus for continuous production of a mixture of solid ammonium sulphate and diammonium phosphate comprising: an evaporator crystallization vessel for continuous evaporation and crystallization of salts from solutions; a saturator vessel adapted for continuous production of crystals therein, a salt draw-off line connected with said evaporator crystallization vessel for off-flow of salt slime therefrom; separating means connected with said salt draw-off line for separating crystals out of the mother liquor from said draw-off line; means for conveying separated crystals from the separating means into said saturator; gas inlet means for introducing gas into said saturator; discharge means for discharging crystals from a solution in said evaporator; and separator means for separating mother liquor from the crystals from said discharge means.

2. Apparatus for continuous production of a mixture of solid ammonium sulphate and diammonium phosphate comprising: an evaporator crystallization vessel for continuous evaporation and crystallization of salts from solutions; a saturator vessel adapted for continuous production of crystals therein; discharge means for discharge of salt slime from said evaporator crystallization vessel; cooling means for cooling the salt slime discharged through said discharge means; separating means connected with said cooling means for receiving and separating crystals out of the mother liquor from said cooling means; means for conveying separated crystals from the separating means into said saturator; gas inlet means for introducing a gaseous medium into said saturator; discharge means for discharging crystals from a solution in said saturator; and separator means for separating mother liquor from crystals from said discharge means.

3. Apparatus for continuous production of a mixture of solid ammonium sulphate and diammonium phosphate comprising: an evaporator crystallization vessel for continuous evaporation and crystallization of salts from solutions; a saturator vessel adapted for continuous production of crystals therein; a salt draw-off line connected with said evaporator crystallization vessel for off-flow of salt slime therefrom; separating means connected with said salt draw-off line for separating crystals out of the mother liquor from said draw-off line; means for conveying separated crystals from the separating means into said saturator; gas inlet means for introducing gas into said saturator; discharge means for discharging crystals from a solution in said evaporator; and separator means for separating mother liquor from the crystals from said discharge means; and means for conveying mother liquor separated out from the crystals from both said separating means to said evaporator crystallization vessel.

4. Apparatus for continuous production of a mixture of solid ammonium sulphate and diammonium phosphate comprising: an evaporator crystallization vessel for continuous evaporation and crystallization of salts from solutions; a saturator vessel adapted for continuous production of crystals therein; a salt draw-off line connected with said evaporator crystallization vessel for off-flow of salt slime therefrom; separating means connected with said salt draw-off line for separating crystals out of the mother liquor from said draw-off line; means for returning the mother liquor separated by said separating means to said evaporator crystallization vessel; means for conveying separated crystals from the separating means into said saturator; gas inlet means for introducing gas into said saturator; discharge means for discharging crystals from a solution in said evaporator; separator means for separating mother liquor from the crystals from said discharge means; a liquid heating vessel connected with said last mentioned separator means for receiving and heating the residual mother liquor therefrom and also connected with the saturator for delivery of vapour thereto and with the evaporator crystallization vessel for delivery of residual heated liquid from said liquid heating vessel.

5. Apparatus for continuous production of a mixture of solid ammonium sulphate and diammonium phosphate comprising: an evaporator crystallization vessel for continuous evaporation and crystallization of salts from solutions; a saturator vessel adapted for continuous production of crystals therein; a salt draw-off line connected with said evaporator crystallization vessel for off-flow of salt slime therefrom; separating means connected with said salt draw-off line for separating crystals out of the mother liquor from said draw-off line; means for conveying separated crystals from the separating means into said saturator; gas inlet means for introducing gas into said saturator; discharge means for discharging crystals from a solution in said evaporator; separator means for separating mother liquor from the crystals from said discharge means; and a washing chamber connected with said saturator vessel for receiving and washing vapours discharging from said saturator vessel.

6. Apparatus for continuous production of a mixture of solid ammonium sulphate and diammonium phosphate comprising: an evaporator crystallization vessel for continuous evaporation and crystallization of salts from solutions; a saturator vessel adapted for continuous production of crystals therein; a salt draw-off line connected with said evaporator crystallization vessel for off-flow of salt slime therefrom; separating means connected with said salt draw-off line for separating crystals out of the mother liquor from said draw-off line; means for conveying separated crystals from the separating means into said saturator; gas inlet means for introducing gas into said saturator; discharge means for discharging crystals from a solution in said evaporator; separator means for separating mother liquor from the crystals from said discharge means; a washing chamber connected with said saturator vessel for receiving and washing vapours discharging from said saturator vessel; and means for conveying spent washing liquor from said washer to said evaporator crystallization vessel.

7. Apparatus for continuous production of solid ammonium sulphate and diammonium phosphate comprising: an evaporator crystallization vessel adapted for continuous evaporation and crystallization of solutions and for deposition of crystals on the bottom thereof; a saturator vessel adapted for continuous production of crystals from a saturated solution therein; cooling means for cooling crystals from the evaporator crystallization vessel; means for delivering crystals from the bottom of said vessel to said cooling means; separating means connected with said cooling means for receiving and separating mother liquor from crystals from said cooler; means for conveying cooled crystals from said separating means to said saturator vessel; means for conveying the mother liquor from said separating means to said evaporator crystallization vessel; separating means for separating mother liquor from crystals from said saturator; means for conveying crystals from the bottom of said saturator to said separating means; heating means for heating the mother liquor from said separating means; means for conveying the residual liquor from said heating means to said evaporator crystallization vessel; and means for conveying vapours from the heated liquor from said heating means to said evaporator.

CHRISTIAN JOHANNES HANSEN.